(No Model.)

B. BLUNDSTONE.
WHEEL TIRE.

No. 458,142. Patented Aug. 18, 1891.

WITNESSES:
Henry J. Miller
Chas. H. Luther Jr.

INVENTOR:
Benjamin Blundstone
by Joseph A. Miller & Co.
Attys.

UNITED STATES PATENT OFFICE.

BENJAMIN BLUNDSTONE, OF PROVIDENCE, RHODE ISLAND, ASSIGNOR TO THE MECHANICAL FABRIC COMPANY, OF SAME PLACE.

WHEEL-TIRE.

SPECIFICATION forming part of Letters Patent No. 458,142, dated August 18, 1891.

Application filed April 27, 1891. Serial No. 390,568. (No model.)

*To all whom it may concern:*

Be it known that I, BENJAMIN BLUNDSTONE, residing at Providence, in the county of Providence and State of Rhode Island, have invented certain new and useful Improvements in Tires; and I hereby declare that the following is a full, clear, and exact description of the same, reference being had to the accompanying drawings, forming part of this specification.

This invention has reference to improvements in flexible tires for use on bicycle or other wheels.

The object of this invention is to produce a hollow elastic tire having a textile lining adapted to reduce the elasticity of the tire in certain parts without affecting the elasticity of the other portions thereof.

To this end my invention consists in producing a textile lining material for tires which will be more expansible in some portions and directions than in others, and securing the same to the inner portion of a hollow tire, as will be more fully explained hereinafter, and pointed out in the claims.

Figure 1:
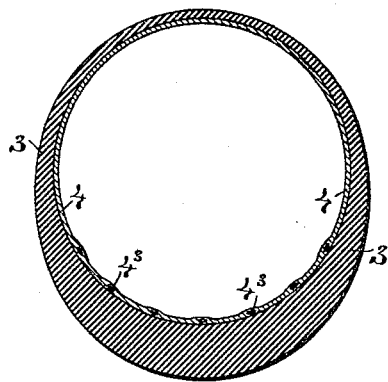
Figure 2:
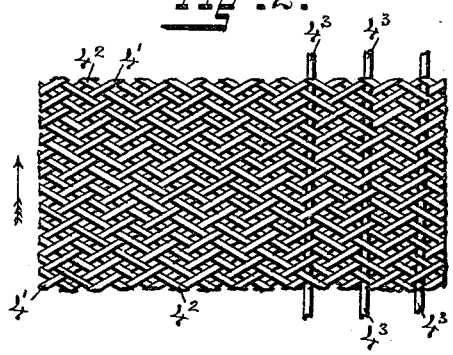

Figure 1 is a cross-sectional view of a hollow rubber tire having my improved lining. Fig. 2 is an enlarged view of a piece of the textile material, showing the manner in which the threads composing the same are interbraided.

Similar numerals of reference designate corresponding parts throughout.

In the drawings, 3 indicates a hollow tire made of rubber or other elastic material.

4 indicates a braided textile lining for the same. The textile lining 4 is formed of the threads $4'$ and $4^2$, which are braided together and extend in directions diagonal to one another around the circumference of the lining, and also the cords $4^3$, which are interbraided with the threads $4'$ and $4^2$ and extend longitudinally of the lining. This textile lining is now secured to the inner surface of the hollow elastic tire by any ordinary means. It will be readily perceived that the lining thus made will be extremely expansible in the length of the lining, (indicated by the arrow in Fig. 2,) except in that portion of the lining through which the cords $4^3$ extend, while the lining will not be expansible in the cross direction.

When a rubber tire is lined with my improved braided lining, the cords $4^3$ are arranged to extend around that portion of the bore of the tire which is farthest removed from the circumference of the wheel, tending to prevent the outer portion of the rubber tire from stretching, while the elasticity of that portion of the tire next adjoining the wheel is not destroyed. The threads $4'$ and $4^2$ extending around the inside of the tire in directions diagonal with the length of the tire will prevent any cross expansion of the tire.

Having thus described my invention, I claim as new and desire to secure by Letters Patent—

1. In a textile lining for elastic hollow tires, the combination, with threads extending in opposite diagonal directions to the length of the lining, of longitudinally-extending cords interbraided with the diagonal threads forming one-half the circumference of the lining and adapted to reduce the longitudinal expansibility of those portions of the lining adjacent to the cords, as described.

2. The combination, with a braided tubular lining formed of diagonally-extending threads and longitudinal interbraided cords, of a hollow elastic tire, to the inner surface of which the lining is secured, as described.

BENJAMIN BLUNDSTONE.

Witnesses:
JOSEPH A. MILLER, Jr.,
M. F. BLIGH.